United States Patent [19]

Uyeda et al.

[11] Patent Number: 4,521,731

[45] Date of Patent: Jun. 4, 1985

[54] DETECTOR ATTACHMENT ARRANGEMENT

[75] Inventors: Takashi Uyeda; Masaaki Matsumoto, both of Sakai, Japan

[73] Assignee: Tsuyama Mfg. Co., Ltd., Japan

[21] Appl. No.: 404,311

[22] Filed: Aug. 2, 1982

[30] Foreign Application Priority Data

Aug. 18, 1981 [JP] Japan .................... 56-122702[U]

[51] Int. Cl.³ .......................... G01P 3/48; G01P 3/12
[52] U.S. Cl. ................................ 324/174; 280/289 R; 324/160
[58] Field of Search ..................... 324/174, 160, 166; 280/289 R

[56] References Cited

U.S. PATENT DOCUMENTS

| | | | |
|---|---|---|---|
| 3,898,563 | 8/1975 | Erisman | 324/174 X |
| 4,331,918 | 5/1982 | Dunch | 324/174 |
| 4,352,063 | 9/1982 | Jones | 324/174 X |

Primary Examiner—Stanely T. Krawczewicz
Assistant Examiner—Jose M. Solis
Attorney, Agent, or Firm—Allegretti, Newitt, Witcoff & McAndrews, Ltd.

[57] ABSTRACT

An arrangement for the attachment of means for the detection of revolutions per minute, etc., comprises a rotary member to be mounted concentrically around a hub of a wheel, said member having a single or, a plurality of, magnet pieces arranged concentrically therein and a plurality of mount openings formed concentrically therein to permit it to be attached to the spokes of a different wheel, and a detector with a built-in magnetic flux sensor mechanism which operates when it enters a magnetic field generated by said rotary member, said detector being equipped with an adjuster mechanism which is clamped onto said hub to hold said sensor mechanism within said magnetic field.

12 Claims, 8 Drawing Figures

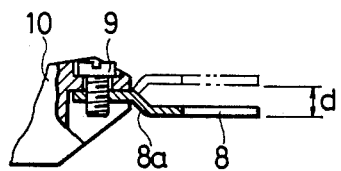
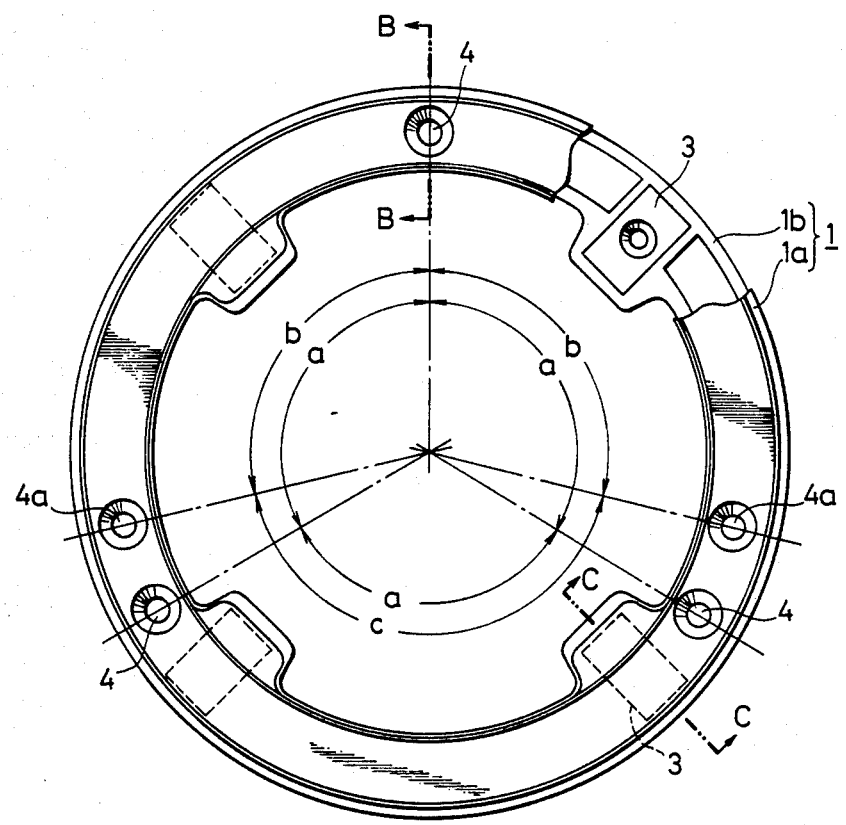

DETECTOR ATTACHMENT ARRANGEMENT

BACKGROUND OF THE INVENTION

The present invention relates to an arrangement for mounting detector sections for speed, etc. to (powered) bicycles, autocycles, and the like.

In Japanese Utility Model Application No. 55-181334 specification, the applicant already came up with a revolutions-per-minute detector comprised of a rotary member having a plurality of magnets concentrically arranged therein, said rotary member being attached to a portion of a wheel, a detector fixed in place in such a manner that it faces said plurality of magnets, said detector having a magnetic flux sensing section comprised of at least a lead switch and a resistance, and an operational display for receiving a pulse signal from said detector and indicating digitally the revolutions per minute.

SUMMARY OF THE INVENTION

A main object of the present invention is to provide an interchangeable arrangement which permits easy and rapid attachment and adjustment of the rotary member and the detector, and can be mounted to a different wheel with no need of using any additional part.

BRIEF DESCRIPTION OF THE DRAWINGS

This and other objects and features of the present invention will become apparent from a reading of the following detailed explanation of preferred embodiments with reference to the accompanying drawings, in which:

FIG. 3 is a partially sectioned plan view showing the mount plate of the detector;

FIG. 4 is a partially cut away front view showing the rotary member;

DETAILED EXPLANATION OF PREFERRED EMBODIMENTS

Figure 1:
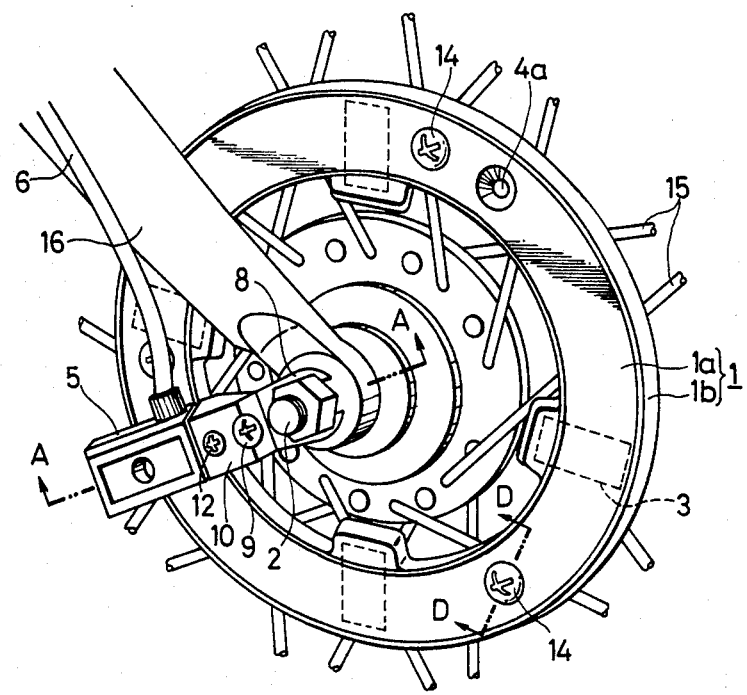
FIG. 1 is a perspective view of one embodiment according to the present invention, which is shown as being attached to a wheel.

Referring now to FIG. 1, a rotary member 1 is formed by putting two annular plates 1a and 1b together, each molded of a nonmagnetic synthetic resin material. As will be seen from FIG. 1, the rotary member 1 is mounted concentrically around a hub 2 of a bicycle wheel for co-rotation therewith, and has a plurality of magnet pieces 3 arranged concentrically. The rotary member 1 is also provided concentrically with a plurality of mount openings 4 and 4a, with which it can be mounted on a variety of wheels without eccentricity (36-spoke wheels and 28-spoke wheels are generally used depending upon the size of the bicycle).

It will be noted from FIG. 3 that with a 36-spoke wheel, three mount openings 4 may be formed concentrically at an equal angle of 120°, and with a 28-spoke wheel, one mount opening 4 and two mount openings 4a may concentrically be formed. In the latter embodiment, an angle b between a line extending through the opening 4 and the center of the circle and a line extending through one opening 4a and the center of the circle is 102.86°, while an angle c between two lines running through two openings 4a and the center of the circle is 154.28°. The present invention is not limited to the above-mentioned two embodiments, although they are preferred.

Figure 2:
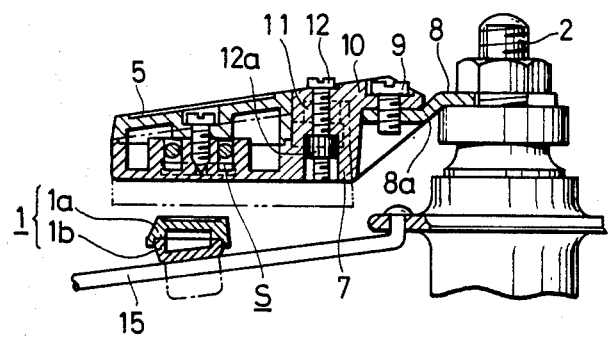
FIG. 2 is a cross-sectional plan view taken along the line A—A of FIG. 1.
Figure 5:
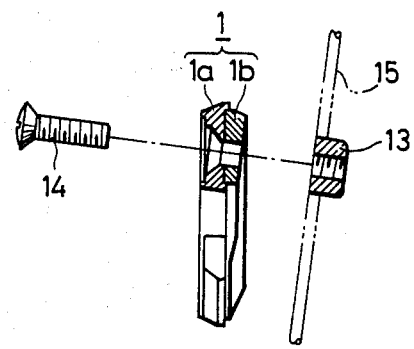
FIG. 5 is a sectional view taken along the line B—B of FIG. 5.
Figure 6:
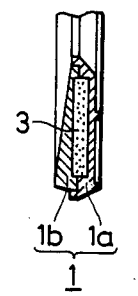
FIG. 6 is a sectional view taken along the line C—C of FIG. 4.
Figure 7:
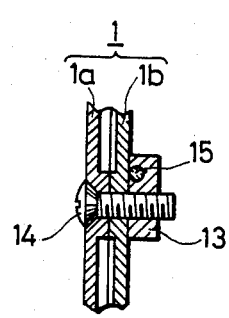
FIG. 7 is a sectional view taken along the line D—D of FIG. 1.
Figure 8:
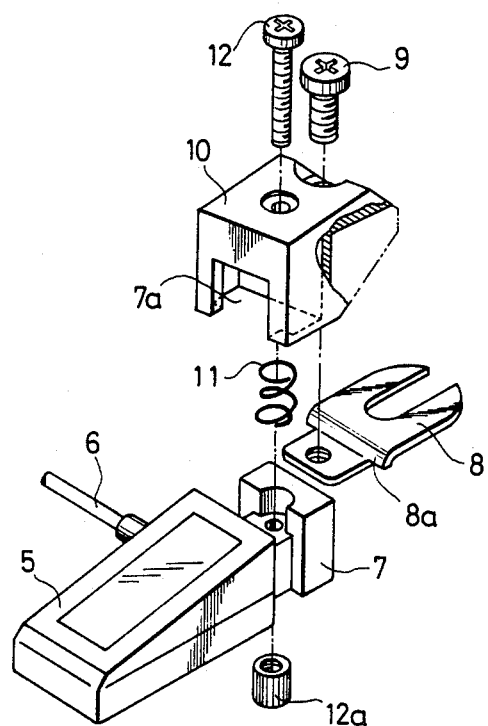
FIG. 8 is an exploded perspective view of the detector.

Referring to FIG. 2, a detector 5 is molded of a synthetic resin material with a built-in magnetic flux sensor mechanism S comprised of a lead switch, a resistance and the like, which operates when it enters a magnetic field generated by each magnet piece 3, and sends the resulting pulse signal to an operational display (not shown) attached to a handle bar via conductor 6. The detector 5 has at its one end a sliding projection 7. A bifurcated mount plate 8 is detachably clamped onto the hub 2 of the wheel by a clamp screw 9. The sliding projection 7 of the detector 5 is slidingly inserted into a groove 7a formed in an adjuster 10 through a coil spring 11, and movable by an adjusting screw 12 engageable with its internally threaded portion 12a.

The rotary member 1 of the present invention is attached to a spoke 15 with a mount screw 14 and a mount piece 13 having a bore, through which the spoke passes, in such a manner that it is positioned concentrically around the hub 2. Making use of the mount plate 2 of the detector 5, the detector 5 is clamped onto the hub 2 with the magnetic flux sensor mechanism S being spaced away from the magnet piece 3 at a given interval. The interval between the mechanism S and the magnet piece 3 may vary depending upon the material and thickness of the mechanism S and the intensity of the magnet, and may usually be 2 to 3 mm since too large or small an interval results in malfunction or failure. Heretofore, the adjustment of the interval has been effected by experts.

According to the present invention, the detector 5 can be adjusted by insertion or loosening of the adjusting screw 12 of the adjuster 10 by a simple tool such as a wrench or the like, without recourse to experts. In addition, there is no fear that the said interval may vary due to vibration, etc., since the sliding projection 7 and the adjuster 10 are supported by the resiliency of the coil spring 11. The interval to be adjusted is about 4 mm or more depending upon the size and shape of the sliding part.

As will be seen from FIG. 3, the mount plate 8 may be formed with a step 8a of a suitable size. When the said interval reaches the predetermined value, the plate 8 is turned out and clamped in place, thereby adjusting a distance d. The addition of such a step enables, in association with the fine adjustment of the screw 12, anyone to mount and adjust easily the present arrangement without recourse to any particular tool or part. In addition, the present arrangement is positioned within the magnetic field so that precise and stable detection of magnetic flux can be effected invariably. Furthermore, the present arrangement is inexpensive to mass-produce owing to its simple structure, and can interchangeably be fitted to various wheels.

While there has been shown and described presently preferred forms of the present invention, it will be understood that various changes may be made to the invention without departing from the spirit and scope thereof, and therefore the invention is limited only by the following claims.

What is claimed is:

1. An arrangement for the attachment of means for the detection of speed of a wheel comprising a rotary member mounted for rotation with said wheel, said rotary member comprising magnet means arranged therein, and mount means for securing said rotary member to said wheel, and a detector comprising a magnetic flux sensor which operates when it enters a magnetic field generated by said rotary member, said detector being non-rotably clamped to hold said sensor within said magnetic field, said wheel being adapted to be rotatably supported on the hub of a wheel, said detector including an adjuster mechanism that is fixed to said hub, said adjuster mechanism being adjustably fixed relative to the detector so as to adjust the position of the detector relative to said rotary member to a predetermined interval.

2. An arrangement as in claim 1 wherein the rotary member comprises an annular member.

3. An arrangement as in claim 2 wherein the wheel comprises a plurality of spokes and the rotary member is secured to said spokes of said wheel for rotation therewith.

4. An arrangement as in claim 3 wherein the rotary member comprises a pair of non-magnetic annular plates enclosing the magnet means.

5. The arrangement as in claim 1 wherein the means for adjustably sliding the projection comprises an adjusting screw engaged with cooperating thread means in the detector and being rotatable to adjust the position of the projection and sensor mechanism therewith with respect to the magnet means.

6. The arrangement as in claim 1 including a spring between the detector and adjuster mechanism for biasing the detector and adjuster mechanism to maintain the adjusted position attained by rotation of the adjusting screw.

7. The arrangement as in claim 1 wherein the mount means comprises a plurality of mount openings formed in the rotary member, said mount openings being on a line concentric to the axis of rotation of the rotary member, at least three openings being equidistantly spaced from one another and at least two openings being offset circumferentially from two of the three equidistantly spaced openings.

8. An arrangement for the attachment of means for the detection of revolutions per minute, etc. comprising a rotary member to be mounted for rotation around the axis of the hub of a wheel, said member having magnet means arranged therein and adapted to be rotated therewith about the axis of the hub, and a plurality of mount openings formed therein to permit said member to be attached to the spokes of one of a number of wheels of different number of spokes and a detector with a built-in magnetic flux sensor mechanism which operates when it enters a magnetic field generated by said rotary member, said detector being equiped with an adjuster mechanism, which is clamped onto said hub to hold said sensor mechanism within said magnetic field, said adjuster mechanism being adjustable to vary the interval between the magnetic flux sensor mechanism and the magnet means.

9. The arrangement as recited in claim 8, wherein said detector includes further a sliding projection which is movably inserted into a groove formed in the adjuster mechanism, onto which a mount plate is detachably clamped, and means for adjustably sliding the projection in the groove to adjust the interval between said sensor mechanism and said rotary member.

10. The arrangement as recited in claim 9, wherein the mount plate of said detector is formed with a step intermediate its ends whereby the mount plate can be repositioned with respect to the detector to adjust the space between sensor mechanism and said rotary member.

11. The arrangement as recited in claim 8 wherein the means for adjustably sliding the projection comprises an adjusting screw engaged with cooperating thread means in the detector and being rotatable to adjust the position of the projection and sensor mechanism therewith with respect to the magnet means.

12. The arrangement as recited in claim 11 including a spring between the detector and adjuster mechanism for biasing the detector and adjuster mechanism to maintain the adjusted position attained by rotation of the adjusting screw.

* * * * *